United States Patent [19]
Sturm et al.

[11] 3,821,247
[45] June 28, 1974

[54] N-(SUBSTITUTED PHENYL)-2,3-DICHLOROMALEIMIDES

[75] Inventors: Elmar Sturm, Arlesheim; Raphael Menasse, Basil, both of Switzerland

[73] Assignee: Ciba-Geigy Corporation, Ardsley, N.Y.

[22] Filed: Mar. 17, 1972

[21] Appl. No.: 235,826

[30] Foreign Application Priority Data
Apr. 2, 1971  Switzerland.......................... 4861/71
Feb. 16, 1972  Switzerland.......................... 2239/72

[52] U.S. Cl...................... 260/326.5 S, 260/326.5 FM, 260/326.5 SF, 424/274
[51] Int. Cl............................................ C07d 27/18
[58] Field of Search............ 260/326.5 FM, 326.5 S

[56] References Cited
UNITED STATES PATENTS
3,129,225  4/1964  Shapiro et al...................... 260/247.2

Primary Examiner—Joseph A. Narcavage
Attorney, Agent, or Firm—Harry Falber; Frederick H. Rabin

[57] ABSTRACT

Compounds of the formula

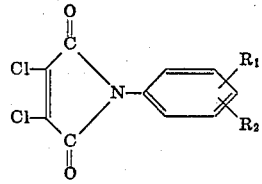

wherein $R_1$ represents halogenomethyl or the group $R_3S(O)_x-$, $R_2$ represents hydrogen or halogen, $R_3$ represents $C_1-C_4$ alkyl, X is 0, 1 or 2, or $R_1$ and $R_2$ represent halogenomethyl, with the proviso that, if $R_1$ is trifluoromethyl and at the same time $R_2$ represents hydrogen, $R_1$ is in the 3- or 4-position, their manufacture and agents for combating phytopathogenic fungi containing them are disclosed.

5 Claims, No Drawings

N-(SUBSTITUTED PHENYL)-2,3-DICHLOROMALEIMIDES

The present invention relates to dichloromaleic imides, their manufacture and their use in pest control. The dichloromaleic imides have the formula

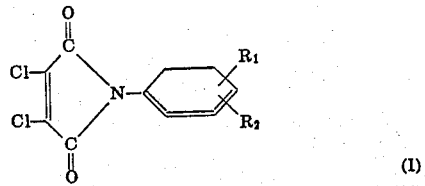

wherein $R_1$ represents halogenomethyl or the group $R_3$-$S(O)_x$—, $R_2$ represents hydrogen or halogen, $R_3$ represents $C_1$–$C_4$ alkyl, X is 0, 1 or 2, or $R_1$ and $R_2$ represent halogenomethyl, with the proviso that if $R_1$ is trifluoromethyl and $R_2$ at the same time represents hydrogen, $R_1$ is in the 3- or 4-position.

The invention relates also to pesticidal agents which contain as active substance a compound of the general formula

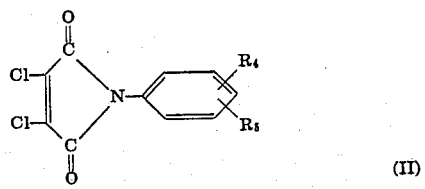

wherein $R_4$ represents halogenomethyl or the group $R_3S(O)_x$—, $R_5$ represents hydrogen or halogen, $R_3$ represents $C_1$–$C_4$ alkyl, X is 0, 1 or 2, or $R_4$ and $R_5$ represent halogenomethyl, together with suitable carriers and/or other additives.

Suitable as halogenomethyl are, for example, —CCl$_2$F, —CClF$_2$ or, in particular, —CF$_3$; halogen is fluorine, bromine iodine or, in particular, Cl.

Methyl is preferred as $C_1$–$C_4$ alkyl.

To be particularly highlighted on account of their action are the compounds of the formula

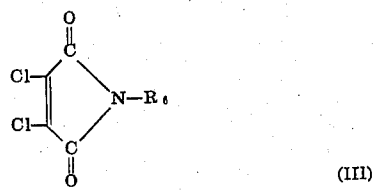

wherein $R_6$ represents

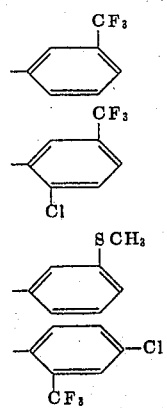

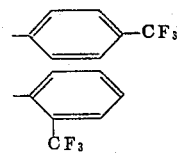

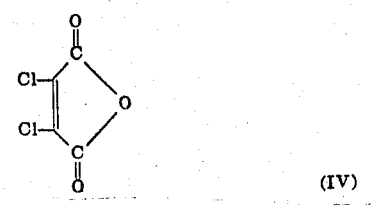

The active substances of the formulae I and II can be manufactured by known methods which are described in the literature, for example by reacting the compound of the formula

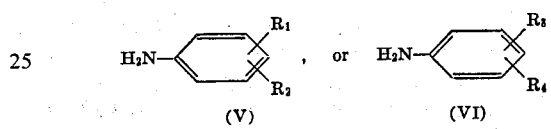

with a compound of the formula

H$_2$N—⟨⟩—$R_1$ , or H$_2$N—⟨⟩—$R_3$
            $R_2$                $R_4$
       (V)                  (VI)

wherein $R_1$ and $R_2$ and $R_3$ and $R_4$ have the meanings given for the formulae (I) and (II), in the presence of acids at elevated temperature, preferably in glacial acetic or hydrochloric acid, for example 6N hydrochloric acid, at a temperature between 80° – 120°C. The starting materials of the formulae (IV) to (VI) are known compounds which can be manufactured by processes which are known per se and described in the literature. The compounds of the formula II possess a broad biocidal activity spectrum and may be used for combating various plant and animal pests.

In very low rates of application these coupounds possess good action against bacteria such, for example, as *Staphylococcus Spez., Bacillus punilis, Bacillus subtilis, Carcina ureae, Streptococcus faecalis, Corybacterium Spez., Brevibacterium Spez.,* Mycobacterium. Preeminent, however, is their action against fungi, in particular plant pathogenic fungi on cereals, maize, rice, vegetables, vines ornamental plants, fruit and other cultures. They are active, for example, against fungi from the series: Omycetes, Zygomycetes; Endomycetales; Aspergillales; Microascales; Protomycetales; Erysiphales; Taphrinales; Pezizales; Helotiales, Phacidiales; Sphaerialles: Clavicipitales: Myriangiales; Dothiorales; Pseudospariales; Aphyllophorales: Tremellales; Auriculariales; Uredinales and Ustilaginales, wie z.B. *Alternaria brassicae, Alternaria atri, Alternaria longipes, Alternaria solani, Aspergillus niger, Botrytis allii, Brotrytis cinerea, Bremia lactuca, Erysiphe cichoracearum, Erysiphe graminis, Erysiphe polygoni, Fusarium lycopersici, Monilia laxa, Peronaspora tabacina; Phytophthora infectans, Piricularia oryzae, Podosphaera leucitricha, Puccinia coronata, Puccinia glumarum, Puccinia graminis, Puccinia stakmanii, Puccinia triticina, Rhizoctonia solani, Sphaerotheca humuli, Sphaerotheca macularis, uncinula necator, Uromyces betae, Ustilago hordei, Ustilago tritici, Ustilago Zeae, Venturia cerasi.*

The compounds of the formula II display likewise good activity against fungi which attack the plants from the soil and partially cause trachemoycoses, for example representatives of the genera: Alternaria, Aphanomyces, Botrytis, Cercosporella, Fusarium, Helmithosporium, Olpidium, Ophiobolus, Sclerotonia, Sclerotiu, Thielavia, Thielaviopsis and Verticillium.

The active substances can also be used for treating seeds, fruit tubers etc. to protect them from bacteria and fungus infections, for example from smut fungi of all kinds, such as Ustilaginales, for example Ustilago species (*Ustilago avenae*), Tilletia species (*Tilletia fritici*), Urocystis, Tuburcinia and Phoma species (*Phoma betae*). On account of their biocidal properties the compounds of the formula II are suitable for the disinfection and protection of materials of the most diverse kinds from attack by bacteria and fungi.

In this connection, it proves particularly advantageous that the compounds of the formula II, when used in the concentrations necessary for the disinfection and protection of materials, display no poisonous side-effects in warm-blooded animals.

The fungicidal action of the compounds of the formula II can be substantially broadened and adapted to the given circumstances by the addition of other fungicides. The following compounds, for example, are suitable additives:

elementary sulphur
ammonium polysulphide and metal polysulphides
boric acid and borates
nickel sulphate
potassium chromate
copper (I) oxide (KUPFEROXID)
Bordeaux broth and further inorganic and organic copper salts
bis-(tri-n-butyl tin)oxide
triphenyl tin hydroxide (FENTINHYDROXID)
triphenyl tin acetate (FENTINACETAT) and further organic tin compounds
methyl mercury-8-hydroxyquinolate (Ortho LM)
N-(methyl mercury)-1,4,5,6,7,7-hexachlorobicyclo[2.2.1]hept-5-ene-2,3-dicarboximide
N-(ethylmercury)-1,4,5,6,7,7,-hexachlorobicyclo[2.2.1]hept-5-ene-2,3-dicarboximide
N-(ethyl mercury)-p-toluenesulphonic anilide
phenyl mercury acetate (PMA)
phenyl mercury urea
mixture of ethyl mercury-2,3-dihydroxypropyl mercaptide and ethyl mercury acetate and further inorganic and organic mercury compounds
0,0-diethyl-phthalimidiphosphonothioate
5-amino-bis-(dimethylamido)phosphinyl-3-phenyl-1,2,4-triazole (TRIAMIPHOS)
5-methylamino-bis-(dimethylamido)-phosphinyl-3-phenyl-1,2,4-triazole
0,0-diethyl-0-2-pyrazinyl-phophoro thioate
0-ethyl-S,S-diphenyl-phosphorodithioate
0-ethyl-S-benzyl-phenyl phosphonodithiote
0,0-diisopropyl-S-benzyl-phosphorothioate
0-butyl-S-ethyl-S-benzyl-phosphorodithioate
0-pentachlorophenyl-bis-(dimethylamido)-phosphate
0-ethyl-S-benzyl-phenyl-phosphonate
diethylamido-benzenethiophosphonic-2-methylimidazolide
methyl bromide
methyl isocyanate
1,3-dichloropropene and related halogenated $C_3$ and $C_4$ hydrocarbons
1-chloro-2-nitro-propane
2-chloro-1-nitropropane
dichlorotetrafluoroacetone
sorbic acid and its potassium salts
dodecylguanidine acetate (dodine)
dodecylguanidine phthalate
acetylene dicarboxylic diamide
1,2-dicyano-1,2-dichloroethylene
1,2-dichloro-1-(methylsulphonyl)ethylene
1,2-dichloro-1-(butylsulphonyl)ethylene
trans-1,2-bis-(n-propylsulphonyl)ethylene
bis-(1,2-trichloroethyl)sulphoxide
bis-(n-propyl-chlorodifluoromethylthio)-sulphone diamide
p-dichlorobenzene
hexachlorobenzene (HCB)
1,2,4-tetrachloro-4-nitrobenzene TECNACEN)
pentachloronitrobenzene (QUINTAZEN)
isomer mixture of 1,3,4-trichloro-2,6-dinitrobenzene and 1,2,3-trichloro-4,6-dinitrobenzene
2,4,5,6-tetrachloroisophthalic nitrile
2,4-dinitrophenyl-thiocyanate
diphenyl
o-nitrodiphenyl
1-chloro-2,4-dinitronaphthalene
2,4,6-trichlorophenyl
2,4,5-trichlorophenyl-chloroacetate
trichlorophenol, zinc salt
m-cresyl acetate
2,3,4,6-tetrachlorophenol
pentachlorophenol (PCP)
o-dihydroxybenzene
2,4-dioxy-n-hexylbenzene
2-phenylphenol
3,5-dibromosalicylaldehyde
2-benzyl-4-chlorophenol
2,2'-dihydroxy-5,5'-dichloro-diphenylmethane (DICHLORPHEN)
2,2'-dihydroxy-3,3',5,5',6,6'-hexachloro-diphenylmethane
2,2'-dihydroxy-5,5'-dichloro-diphenylsulphide
2,2'-dihydroxy-3,3',5,5'-tetrachloro-diphenylsulphide
disodium-2,2'-dihydroxy-3,3',5,5'-tetrachloro-diphenylsulphide
4-chloro-o-phenylphenol
1,4-dichloro-2,5-dimethoxybenzene (CHLORNEB)
salicylanilide
1,2-bis-(3-methoxycarbonyl-2-thiourea)-benzene
1,2-bis-(3-ethoxycarbonyl-2-thiourea)-benzene
(3,5-dimethyl-4-chlorophenoxy)-ethanol
1,4-dichloro-2,5-dimethoxybenzene
2,4,5-trichlorophenylsulphonylmethylthiocyanate
phenylmercapto-methanesulphonamide
2-(1-methyl-n-propyl)-4,6-dinitrophenyl-2-methylcrotonate (BINAPACRYL)
2-(1-methyl-n-propyl)4,6-dinitrophenylisopropylcarbonate (DINOEUTON)
2-(1-methyl-n-heptyl)-4,6-dinitrophenylcrotonate (DINOCAP)
methyl-2,6-dinitro-4-(1-ethyl-hexyl)phenylcarbonate +
methyl-2,6-dinitro-4-(1-propyl-pentyl)phenylcarbonate (DINOCTON)

4-nonyl-2,6-dinitro-phenylbutyrate
S-methyl-2-(1-methyl-n-heptyl)-4,6-dinitrophenylthiocarbonate
1-(3,4-dichloroanilino)-1-formylamino-2,2,2-trichloroethane
2,6-dichloro-4-nitroaniline (DICHLORAN)
2-cyanoethyl-N-phenylcarbamate
propynyl-N-phenylcarbamate
2-methyl-benzoic anilide
2-iodo-benzoic anilide
2-chloro-benzoic anilide
2,3,5,6-tetrachloro-benzoquinone (1,4) (CHLORANIL)
2,3-dichloro-naphthoquinone(1,4) (DICHLON)
2-amino-3-chloro-naphthoquinone (1,4)
2-chloro-3-acetamino-naphthoquinone(1,4)
4-methyl-2,3,5,10-tetrahydro-3,5,10-trioxo-4H4-H-naphtho(2,3,-b)-1,4-thiazine
quinoximbenzoylhydrazone (BENQUINOX)
N-(trichloromethylthio)phthalimide (FOLPET)
N-(trichloromethylthio)cyclohex-4-ene-1,2-dicarboximide (CAPTAN)
N-(1,1,2,2-tetrachloroethylthio)cyclohex-4-ene-1,2-dicarboximide (CAPTAFOL)
N-(1,1,2,2,-tetrachloroethylthio)cyclohex-4-ene-1,2-dicarboximide
N'-dichlorofluoromethylthio-NN-dimethyl-N'-phenylsulphamide (DICHLOFLUANIDE)
S-(2-pyridyl-1-oxide)-S'-trichloromethyl-disulphide:hydrochloride
sodium-N-methyl-dithiocarbamate (METHAM)
sodium-N,N-dimethyl-dithiocarbamate (DDC)
zinc-N,N-dimethyl-dithiocarbamate (ZIRAM)
iron-N,N-dimethyl-dithiocarbamate (FERBAM)
disodium-ethylene-1,2-bis-dithiocarbamate (NABAM)
zinc-ethylene-1,2-bis-dithiocarbamate (ZINEB)
manganese (II) -ethylene 1,2-bis-dithiocarbamate (MANEB)
zinc-propylene-1,2-bis-dithiocarbamate (MEZINEB) (PROPINEB)
complex consisting of (MANEB) and zinc (MANCOZEB)
tetramethylthiuramdisulphide (THIRAM)
complex consisting of (ZINEB) and polyethylene thiuramdisulphide (METIRAM)
bis-(3,4-dichloro-2(5)-furanoyl)ether (mucochloric anhydride)
2-methoxymethyl-5-nitrofuran
5-nitro-furfuradoxime-(2)
5-nitro-fufuryl-amidoxime-(2)
1-oxy-3-acetyl-6-methyl-cyclohexene-(5)dione(2,4-)dehydroacetic acid)
4,5,6,7-tetrachlorophthalide
3-[2-(3,5-dimethyl-2-oxycyclohexyl)-2-hydroxyethyl]-glutarimide (cycloheximide)
phthalimide
pyridine-2-thiol-1-oxide and 1-hydroxypyridine-2-thione
β,β-bis(4-chlorophenyl)-3-pyridine-methanol (PARINOL)
8-hydroxyquinoline (3-QUINOLINOL)
8-hydroxyquinoline-sulphate (CHINOSOL)
benzoyl-8-hydroxyquinoline-salicylate
6-ethoxy-1,2-dihydro-2,2,4-trimethylquinoline (ETHOXYQUIN)
N-lauryl-isoquinolinium bromide
9-(p-n-hexyloxyphenyl)-10-methyl-acridinium chloride
2-n-heptadecylimidazoline acetate (GLYODIN)
1-hydroxyethyl-2-heptadecylimidazoline
1-phenyl-3,5-dimethyl.4-nitrosopyrazole
1-p-chlorophenyl-3,5-dimethyl-4-nitrosoopyrazole
N-(1-phenyl-2-nitropropyl)piperazine
N,N'-bis[1-formamido-2,2,2-trichloroethyl]-piperazine
2-dimethylamino-6-methyl-5-n-butyl-4-hydroxypyrimidine
N-dodecyl-1,4,5,6-tetrahydropyrimidine
N-dodecyl-2-methyl-1,4,5,6-tetrahydroxypyrimidine
2-n-heptadecyltetrahydropyrimidine
1-(4-amino-4-propyl-5-pyrimidyl-methyl)-2-methyl-pyridiniumchloride hydrochloride
2-(2'-furyl)-benzimidazole (FUBERIDAZOL)
3-dodecyl-1-methyl-2-phenylbenzimidazolium ferricyanide
methyl-n-benzimidazol-2-yl-N-(butylcarbamoyl)carbamate (BENOMYL)
2-(o-chloroanilino)-4,6-dichloro-sym.triazine
2-ethylamino-6-methyl-5-n-butyl-4-hydroxypyrimidine
2,6-dichloro-3,5-dicyano-4-phenylpyridine
α-(2,4-dichlorophenyl)-α-phenyl-5-pyrimidine-methynol
5-chloro-4-phenyl-1,2-dithiol-3-one
2,3-dicyano-1,4-dithia-anthraquinone (DITHIANON)
2-(4-thiazolyl)-benzimidazole
4-(2-chlorophenylhydrazono)-3-methyl-5-isoxazolone (DRAZOXOLON)
thiazolidinone-4-thione(2) (RHODANIN)
3-(p-chlorophenyl)-5-methylrhodanine
3,5-dimethyltetrahydro-1-3,5-thiadiazine-2-thione (DAZOMET)
3,3'-acetylene-bis-(tetrahydro-4,6-dimethyl)-2H-1,3,5-thiadazine-2-thione) (MILNEB)
3-benzylidene-amino-4-phenylthiazoline-2-thione
6-chlorobenzthiazole-2-thiole, zinc salt
6-β-diethylamino-ethoxy-2-dimethylamino-benzthiazole-dihydrochloride
monoethanolammonium-benzthiazole-2-thiole
laurylpyridinium-5-chloro-2-mercaptobenzthiazole
6-(β-diethylaminoethoxy)-2-dimethylaminobenzthiazole-dihydrochloride
3-trichloromethylthiobenzothiazolone
3-trichloromethylthiobenzoxazolone
3-(trichloromethyl)-5-ethoxy-1,2,4-thiadiazole
6-methyl-2-oxo-1,3-dithiolo[4,5-b]-quinoxaline (QUINOMETHIONAT)
2-thio-1,3-dithiolo[4,5-b]-quinoxaline (THIOQUINOX)
2,3-dihydro-5-carboxanilido-6-methyl-1,4-oxathiine
2,3-dihydro-5-carboxanilido-6-methyl-1,4-oxathiine-4,4-dioxide
2,3-dihydro-5-carbox-o-diphenylamido-6-methyl-1,4-oxathiine
N-cyclododecyl-2,6-dimethylmorpholine acetate
N.tridecyl-2,6-dimethylmorpholine
3-(3',5'-dichlorophenyl)-5,5-dimethyloxazolidine-2,4-dione cetyl-trimethylammonium bromide
n-alkyl($C_{12}$,$C_{14}$,$C_{16}$)dimethylbenzylammonium chloride
dialkyldimethylammonium bromide alkyldimethylbenzylammonium chloride
alkyl C₉–C₁₅ tolylmethyltrimethylammonium chloride
p-di-isobutylphenoxyethoxyethyldimethylbenzylammonium chloride gliotoxin
2,4-diguanidino-3,5,6-trihydroxycyclohexyl-5-deoxy-2-0-(2-deoxy-2-methylamino-α-L-glucopyranoxyl)3-C-formyl-β-L-lyxopentanofuranoside (STREPTOMYCIN)
7-chloro-4,6-dimethoxycumaran-3-one-2-spiro-1'-(2'-methoxy-6'-methylcyclohex-2'-ene-4'-one (GRISEOFULVIN)
4-dimethylamino-1,4,4a,5,5a,6,11,12a-octahydro-3,5,6,10,12,12a-hexahydroxy-6-methyl-1,11-dioxo-2-naphthacene-carboximide (OXYTETRACYCLIN)
7-chloro-4-dimethylamino-1,4,4a,5,5a,6,11,12a-octahydro-3,6,10, 12,12a-pentahydroxy-6-methyl-1,11-dioxo-2-naphthacene-carboximide (CHLORTETRACYCLIN)
(PIMARCIN)
(LANCOMYCIN)
(PHLEOMYCIN)
(KASUGAMYCIN)
(PHYTOACTIN)
D(-)-threo-2,2-dichloro-N-3-hydroxy-a-(hydroxymethyl)-p-nitrophenethyl-acetamide (CHLORAMPHENICOL)
blasticidin-S-methyl-benzylamino-benzenesulphonate
N-(3,5-dichlorophenyl)-succinimide
N-(3,5-dichlorophenyl)-itaconimide
N-(3-nitrophenyl)-itaconimide
phenoxyacetic acid
sodium-p-dimethylamino-benzenediazosulphonate
acrolein-phenylhydrazone
2-chloroacetaldehyde-(2,4-dinitrophenyl)-hydrazone
2-chloro-3-(tolylsulphonyl)-propionitrile
1-chloro-2-phenyl-pentane-diol(4,5)-thione(3)
p-nonylphenoxypolyethyleneoxyethanol iodine complex
(α-nitromethyl)-o-chlorobenzythioethylamine hydrochloride
3-(p-t.butyl-phenylsulphonyl)-acrylonitrile
octachlorocyclohexenone
pentachlorobenzyl alcohol
pentachlorobenzyl acetate
pentachlorobenzaldehyde cyanohydrin
2-norcamphane-methanol
2,6-bis-(dimethylaminoethyl)-cyclohexanone
decachloro-octahydro-1,3,4-metheno-2H-cyclobuta[cd]pentalen-2-one 1-(3-chloroallyl)-3,5,7-triaza-1-azonia adamantane chloride Furthermore, the compounds of the formula I possess anthelmintic properties and may be used for combating endoparasitic nematodes, cestodes and trematodes in domestic and farm animals.

The compounds of the formula II may be used as pure concentrate or together with suitable carriers and/or other additives.

Suitable carriers and additives may be solid or liquid and correspond to the substances conventionally used in formulation technology, for example solvents, dispersants, wetting agents, adhesives, thickeners, binders or fertilisers.

The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms
  dusts, tracking agents, granules, coated granules, impregnated granules and homogeneous granules.

Liquid forms:
  a. active substances which are dispersible in water: wettable powders, pastes, emulsions;
  b. solutions.

To manufacture solide forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminum silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

The particle size of the carriers for dusts is advantageously up to about 0.1 mm, for tracking agents from about 0.075 to 0.2 mm, and for granules 0.2 mm or larger.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having five to 15 ethylene oxide radicals per molecule and eight to nine carbon atoms in the alkyl radical, lignin sulphonic acids, their alkali metal and alkaline earth metal salts, polyethylene glycol ethers (carbowaxes), fatty alcohol polyethylene glycol ethers having five to 20 ethylene oxide radicals per molecule and eight to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetalene glycols, dialkyl dilauryl ammonium chloride and fatty acid alkali and alkaline earth metal salts.

Suitable anti-foam agents are silicones.

The active substances are so mixed, ground sieved and strained with the additives mentioned above that, in wettable powders, the solid particle size of from 0.02 to 0.04 and in pastes, of 0.03 is not exeeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active aubstances or several active substances of general formula II are dissolved in suitable organic solvents, mixtures of solvents or in water. Aliphatic and aromatic hydrocarbons, chlorinated derivatives thereof, alkyl naphthalenes and mineral oils alone or mixed with each other, can be used as organic solvents.

In addition to fungicidal active substances, the agents described according to the invention can be mixed with other biocidally active substances or agents. Thus in order to broaden the activity spectrum the new agents may contain, for example, insecticides, fungicides, bactericides, fungistatics, bacteriostatics or nematocides, in addition to the cited compounds of the formula I. The agents according to the invention may also contain plant fertilisers, trace elements etc.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the formula II can, for example, be formulated as follows:

Dusts

The following substances are used for the preparation of a) a 5% dust, and b) a 2% dust:
a. 5 parts of active substance
  95 parts of talcum.
b. 2 parts of active substance
  1 part of highly dispersed silicic acid
  97 parts of talcum.

The active substances are mixed and ground with the carriers.

The following substances are used to produce a 5 % granulate:
5 parts of active substance,
0.25 parts of epichlorhydrin,
0.25 parts of cetyl polyglycol ether,
3.50 parts of polyethylene glycol
91 parts of kaolin (particle size 0.3 – 0.8 mm).

The active substance is mixed with epichlorhydrin and dissolved with six parts of acetone; the polyethylene glycol and cetyl polyglycol ether are then added. The thus obtained solution is sprayed on the kaolin, and the acetone subsequently evaporated in vacuo.

Wettable powder

The following constituents are used for the preparation of a) a 40%, b) and c) a 25%, and d) a 10% wettable powder:
a. 40 parts of active substance,
  5 parts of sodium lignin sulphonate,
  1 part of sodium dibutyl-naphthalene sulphonate,
  54 parts of silicic acid.
b. 25 parts of active substance,
  4.5 parts of calcium lignin sulphonate
  1.9 parts of Champagne chalk/hydroxyethyl cellulose mixture (1:1),
  1.5 parts of sodium dibutyl naphthalene sulphonate,
  19.5 parts of silicic acid,
  19.5 parts of Champagne chalk,
  28.1 parts of kaolin.
c. 25 parts of active substance,
  2.5 parts of isooctylphenoxy-polyoxyethylene-ethanol,
  1.7 parts of Champagne chalk/hydroxyethyl cellulose mixture (1:1),
  8.3 parts of sodium aluminum silicate,
  16.5 parts of kieselguhr,
  46 parts of kaolin.
d. 10 parts of active substance,
  3 parts of a mixture of the sodium salts of saturated fatty alcohol sulphates,
  5 parts of naphthalenesulphonic acid/formaldehyde condensate,
  82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates

The following substances are used to produce a) a 10% and b) a 25% emulsifiable concentrate:
a. 10 parts of active substance,
  3.4 parts of epoxidised vegetable oil,
  13.4 parts of a combination emulsifier consisting of fatty alcohol polyglycol ether and alkylarylsulphonate calcium salt,
  40 parts of dimethylformamide,
  43.2 parts of xylene.
b. 25 parts of active substance,
  2.5 parts of epoxidised vegetable oil,
  10 parts of an alkylarylsulphonate/fatty alcohol-polyglycol ether mixture
  5 parts of dimethylformamide,
  57.5 parts of xylene.

From these concentrates it is possible to produce, by dilution with water, emulsions of any desired concentration.

Spray

The following constituents are used to prepare a 5% spray:
5 parts of active substance,
1 part of epichlorohydrin,
94 parts of benzine (boiling limits 160°–190°C).

EXAMPLE 1 a. Manufacture of N-3-trifluoromethylphenyl-2,3-dichloromaleic imide

While stirring, 3-aminobenzotrifluoride (483 g) was added dropwise to 2,3-dichloromaleic anhydride (501 g) in 1,400 ml of glacial acetic acid over the course of 30 minutes, in the course of which the internal temperature rises from 18°C to 48°C. The reaction mixture was then heated for 1 hour to 100°C.

After the usual process steps and recrystallisation from methanol, the active substance No. 1 of the formula

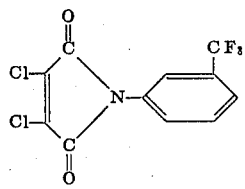

was obtained (m.p. 94°–95°C).

b. Manufacture of N-3,5-bistrifluoromethylphenyl-dichloromaleic imide

While stirring vigorously, 3,5-bistrifluoromethylaniline (23 g) in 150 ml of 6N HCl was added dropwise at 83°C to 2,5-dichloromaleic anhydride 17 g) in 100 ml of 6N HCl. The reaction mixture was kept for 8 hours at 100°–110°C, then cooled. The aqueous phase was discarded and after recrystallisation from methanol, active substance No. 2 of the formula

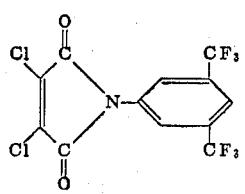

was obtained (m.p. 90°–92°C.

The following compounds are also manufactured by means analogous to those described in a) and b):

| Active substance number | Structure | M.P., °C. |
|---|---|---|
| 3 | (Cl, Cl maleimide N-phenyl with CF$_3$ and Cl substituents) | 147 |
| 4 | (Cl, Cl maleimide N-phenyl with CF$_3$ and Cl substituents) | 110–112 |
| 5 | (Cl, Cl maleimide N-phenyl with Cl and CF$_3$ substituents) | 165–167 |
| 6 | (Cl, Cl maleimide N-phenyl with CF$_3$) | 200 |
| 7 | (Cl, Cl maleimide N-phenyl with CF$_3$) | 149–150 |
| 8 | (Cl, Cl maleimide N-phenyl with SCH$_3$) | 122–124 |
| 9 | (Cl, Cl maleimide N-phenyl with SCH$_3$) | 247 |
| 10 | (Cl, Cl maleimide N-phenyl with SOCH$_3$) | 143 |
| 11 | (Cl, Cl maleimide N-phenyl with SO$_2$CH$_3$) | 198 |
| 12 | (Cl, Cl maleimide N-phenyl with SCH$_3$) | ---------- |
| 13 | (Cl, Cl maleimide N-phenyl with Cl and CF$_3$) | ---------- |

EXAMPLE 2

Action against *Botrytis cinerea* on *Vicia faba*

Fully developed, uniformly large leaves of *Vicia faba*, which have been sprayed dripping wet from a spraying device with a broth (0.1% content of active substance) prepared from an active substance formulated as a 10% wettable powder, were placed three at a time in Petri dishes lined with filter paper. When the leaves were dry again, they were infected with a freshly prepared, standardised spore suspension of the fungus (concentration: 100,000 spores/ml) and kept for 48 hours in a humid atmosphere at 20°C. After this time, the leaves displayed black, initially dot-shaped specks which rapidly spread. The number and size of the infected areas served as a yardstick for determining the effectiveness of the test substance.

RESULT

| | |
|---|---|
| Active substance No. 2 | 0-5% attack. |
| Active substance No. 4 | Do. |
| Active substance No. 5 | Do. |
| Active substance No. 7 | Do. |
| Active substance No. 8 | Do. |
| Active substance of the formula | 60-100% attack. |

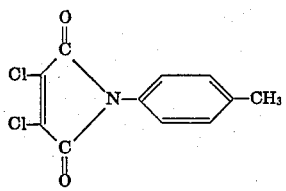

known from U.S. Patent 3,297,522.
Control ................................................ 100% attack.

EXAMPLE 3

Action afainst *Erysiphe cichoracearum* on *Cucumis sativus*

Young *Cucumis sativus* plants were sprayed with a spore suspension of the fungus after they had been sprayed with a 0.01% suspension of the active substance formulated as wettable powder and after the spray coating had dried. The degree of attack (extent of the leaf surface coated with the mycel coating) on the infected, treated leaves was assessed after 8 days in a greenhouse at approx. 23°C in comparison with untreated, infected controls.

RESULT

| | |
|---|---|
| Active substance No. 1 | 0-5% attack. |
| Active substance of the formula | 60-100% attack. |

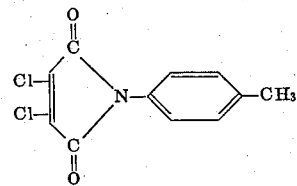

known from U.S. Patent 3,297,522.
Control ................................................ 100% attack.

EXAMPLE 4

Action against *Uromyces appendiculatus* on *Phaseolus vulgaris*

*Phaseolus vulgaris* plants in the two-leaf stage were sprayed dripping wet with a suspension of the substance formulated as wettable powder (concentration: 0.1% of active substance). After the coating layer had dried, the plants were infected with a fresh spore suspension of bean rust and then kept for 1 day day in a humid chamber, then for 12 days in a greenhouse at 20°-22°C.

The number and size of the rust pustules served as a yardstick for evaluating the effectiveness of the test substances.

RESULT

| | |
|---|---|
| Active substance No. 3 | 0-5% attack. |
| Active substance of the formula | 60-100% attack. |

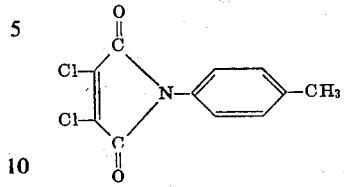

known from U.S. Patent 3,297,522.
Control ................................................ 100% attack.

EXAMPLE 5

Action against *Phytophthora infestans* on Solanum-Lycpersicum

S. Lycopersicum plants of the same variety and in the same stage of development were sprayed with a broth of 0.1% active substance (prepared from the active substance formulated as a wettable powder). When dry, the plants were sprayed dripping wet with a zoospore suspension of Ph. infestans. They were then kept for 6 days in a greenhouse at 18°-20°C and high humidity (95-100%), after which time they displayed typical leaf specks. The evaluation of the tested substance was based on their number and size.

RESULT

| | |
|---|---|
| Active substance No. 3 | 0-5% attack. |
| Active substance of the formula | 60-100% attack. |

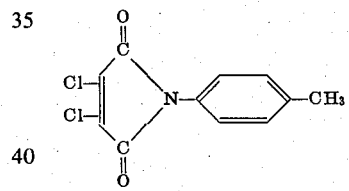

known from U.S. Patent 3,297,522.
Control ................................................ 100% attack.

EXAMPLE 6

Action against *Podosphaera leucotricha* (Ell. et Ev.) Salm. on young apple trees Apple tree cuttings of the type MM III were reared in a greenhouse at 20°C and 90% relative humidity throughout the duration of the test. When three to four leaves had formed on each of the developing lateral shoots, these leaves were sprayed dripping wet with a broth (0.1% content of active substance) prepared from the active substance formulated as 10% wettable powder. After the coating layer had dried, the leaves were uniformly sprayed on the topside with a spore suspension of the fungus.

The trees were sprayed again wiht the above described active substance preparation 7-14 days after the first treatment. The test was evaluated 12 days after the first treatment. The test was evaluated 12 days after the final treatment.

The number and size of the infected areas served as a yardstick for evaluating the effectiveness of the test substance.

| Result: | |
|---|---|
| Active substance No. 1 | 0–5% attack |
| Control | 100% attack |

| Result: | |
|---|---|
| Active substance No. 1 | 0–5% attack |
| Control | 100% attack |

EXAMPLE 7

Action against *Plasmopora viticola* (Bert. et Curt.) (Berl. et De Toni) on vines Vine cuttings of the variety "Chasselas" were reared in a greenhouse. Three plants in the 10-leaf stage were sprayed dripping wet with a broth (0.1% active substance content) prepared from the active substance formulated as a 10% wettable powder. After the coating layer had dried, the plants were uniformly infected on the underside of the leaves with the spore suspension of the fungus. The plants were subsequently kept for 8 days in a humid chamber, after which time the symptoms of disease became visible on the control plants. The number and size of the infected areas served as a yardstick for evaluating the effectiveness of the active substance,

| Result: | |
|---|---|
| Active substance No. 1 | 5–20% attack |
| Control | 100% attack |

EXAMPLE 8

Action against *Septoria agricola* Spegazzini on celery plants

Celery plants of the variety "Challon" were in a greenhouse. 15 centimetre high plants were each sprayed dripping wet with a broth (0.1% content of active substance) prepared from the active substance formulated as 10% wettable powder. After the coating layer had dried, the plants were infected with a spore suspension of the fungus. Symptoms of disease occured after 2 days in a humid chamber and 12 days at 20°–22°C and 90% relative humidity in a greenhouse. The number and size of the infected areas served as a yardstick for evaluating the effectiveness of the test substance.

| Result: | |
|---|---|
| Active substance No. 1 | 5–20% attack |
| Control | 100% attack |

EXAMPLE 9

Action against *Erysiphe graminis* DC. on Triticum

In a greenhouse at 20°C young wheat plants app. 10 cm in length are sprayed dripping wet with a broth (0.1% active substance content) prepared fron the active substance formulated as a 10% wettable powder. When the coating had dried, the plants were infected with conidia of the fungus. The percentage attack on the plants was ascertained after 12 days (greenhouse at 20°C).

EXAMPLE 10

Action against *Puccinia triticina* Erites on Triticum

In a greenhouse at 20°C young wheat plants app. 10 cm in length were sprayed dripping wet with a broth (0.1% content of active substance) prepared from the active substance formulated as a 10% wettable powder. When the coating layer had dried, the plants were uniformly infected with a uredospore suspension of the fungus. Evaluation took place after 5 days in a humid chamber and 12 days in a greenhouse at 20°–22°C and normal relative humidity. The number and size of the infected areas served as a yardstick for evaluating the effectiveness of the test substance.

| Result: | |
|---|---|
| Active substance No. 1 | 0–5% attack |
| Control | 100% attack |

EXAMPLE 11

Action against *Piricularia Oryzae* Bri. et Cav. on rice

Rice plants were reared in a greenhouse and sprayed once prophylactically with an aqueous spray broth containing 0.1% active substance. Two days later, the 10 treated plants were infected with exospores of Piricularia oryzae Bri. et Cav. and examined for attack by fungus after 5 days incubation in a humid chamber.

| Result: | |
|---|---|
| Active substance No. 5 | 0–5% attack |
| Active substance No. 7 | 0–5% attack |
| Control | 100% attack |

The other compounds according to Example 1 act in the tests according to Examples 2 to 11.

We claim:

1. The compound of the formula

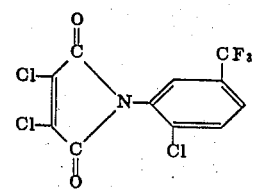

2. The compound of the formula

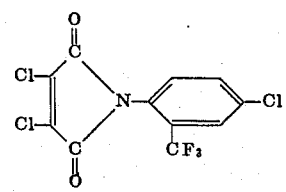

3. The compound of the formula
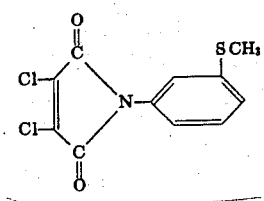
4. The compound of the formula
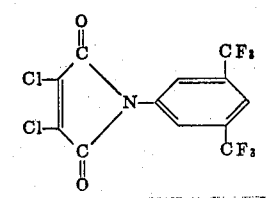
5. The compound of the formula
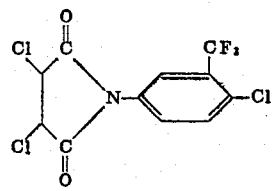
* * * * *